United States Patent
Chen et al.

(10) Patent No.: US 9,459,999 B2
(45) Date of Patent: Oct. 4, 2016

(54) MEMORY CONTROL METHOD FOR A COMPUTER SYSTEM

(71) Applicant: INTERNATIONAL BUSINESS MACHINES CORPORATION, Armonk, NY (US)

(72) Inventors: Chun-Wei Chen, New Taipei (TW); Jenseng J S Chen, New Taipei (TW); Albert Lee, Taipei (TW); Alex C P Lee, Taipei (TW); Kelvin Shieh, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/692,317

(22) Filed: Dec. 3, 2012

(65) Prior Publication Data
US 2013/0166871 A1    Jun. 27, 2013

(30) Foreign Application Priority Data
Dec. 23, 2011  (TW) .............................. 100148413 A

(51) Int. Cl.
*G06F 12/02* (2006.01)
(52) U.S. Cl.
CPC ... *G06F 12/0223* (2013.01); *G06F 2212/1028* (2013.01); *Y02B 60/1225* (2013.01)
(58) Field of Classification Search
CPC .............. G06F 12/00; G06F 12/0246; G06F 12/0284; G06F 3/0605; G06F 1/3206; G06F 1/3203; G06F 1/3225; G06F 1/324; G06F 3/0653
See application file for complete search history.

(56) References Cited

U.S. PATENT DOCUMENTS

| | | | |
|---|---|---|---|
| 6,760,818 B2 * | 7/2004 | van de Waerdt | 711/137 |
| 7,426,649 B2 * | 9/2008 | Brittain | G11C 5/143 711/100 |
| 7,907,823 B2 * | 3/2011 | Jureczki et al. | 386/252 |
| 8,281,169 B2 * | 10/2012 | Borras | G06F 1/3203 711/100 |
| 2008/0005531 A1 * | 1/2008 | Praca | 711/209 |
| 2009/0089491 A1 * | 4/2009 | Hatanaka et al. | 711/103 |
| 2009/0150710 A1 * | 6/2009 | Bilger et al. | 713/600 |
| 2009/0327794 A1 * | 12/2009 | Kapil | 713/600 |
| 2010/0070695 A1 * | 3/2010 | Baek et al. | 711/104 |
| 2010/0153618 A1 * | 6/2010 | Mathieson | G06F 12/00 711/102 |
| 2011/0093726 A1 * | 4/2011 | Worthington et al. | 713/320 |
| 2011/0145609 A1 * | 6/2011 | Berard et al. | 713/320 |
| 2012/0144144 A1 * | 6/2012 | Worthington et al. | 711/165 |

* cited by examiner

*Primary Examiner* — Adam M Queler
*Assistant Examiner* — Alex Olson
(74) *Attorney, Agent, or Firm* — Brandon C. Kennedy; Grant A. Johnson; Kennedy Lenart Spraggins LLP

(57) ABSTRACT

A memory control method for a computer system is provided. The method includes the steps of: (a) calculating an operation cost of each of given M memory objects in each of N memory regions, M being an integer larger than 0, wherein the operation cost is a quantifiable parameter of a said memory region with respect to a said memory object operating therein; (b) determining an optimized allocation of the M memory objects in the N memory regions according to the calculated operation cost of each of the M memory objects in each of the N memory regions.

18 Claims, 3 Drawing Sheets

MEMORY CONTROL METHOD FOR A COMPUTER SYSTEM

CLAIM OF PRIORITY

This application claims priority under 35 U.S.C. §119 to Taiwan Patent Application No. 100148413 filed Dec. 23, 2011, the entire text of which is specifically incorporated by reference herein.

BACKGROUND OF THE INVENTION

1. Field of the Invention

The present invention relates to a memory control method and a computer system for performing the same.

2. Description of Related Art

A policy pertaining to allocating memory objects in specific memory physical regions can be devised in accordance with considerations given to the energy consumption or performance of a conventional computer system, as disclosed in US 2011/0145609.

SUMMARY OF THE INVENTION

In an aspect, the present invention provides a memory control method and a computer system for performing the same. In particular, the present invention is focused on operation costs and thus discloses performing memory control. In an embodiment of the present invention, an operation cost is a quantifiable parameter (and especially a parameter related to resources available to operation) of a memory region with respect to a memory object operating therein. Hence, it is feasible to use a mathematical algorithm to determine whether the operation cost meets a need or is optimized and adjust the allocation of the memory objects in the memory region.

For instance, the operation cost of a memory object in a memory region is calculated according to energy consumption, the size of the memory region occupied by the memory object, the baseband of the memory region, and/or the access frequency of the processor accessing the memory object in the memory region.

In addition, the present invention evaluates the use of related resources in terms of an operation cost (i.e., a quantifiable parameter) with a view to introducing a specific algorithm. Hence, in the context of the present invention, a user-defined parameter can also be applicable to an operation cost rather than restricted to physical resources, for example, a pecuniary cost of purchasing (or renting) memory, a time cost of executing a procedure related to the memory objects, or even a risk cost in the context of commercial operation. In this context, an operation cost is even not restricted to a positive value or a negative value, which represents specific consumption or production, respectively, depending on the way of defining the resources from a user's point of view.

In another aspect, the present invention discloses performing overall memory control rather than merely optimizing the memory allocation of a single memory object. In practice, multiple memory objects usually coexist in a system, but a method for optimizing a single memory object which has already undergone a categorization process beforehand (as disclosed in US 2011/0145609) fails to meet actual needs.

By contrast, according to the present invention, it is feasible to perform numerical processing and planning on the operations costs incurred as a result of all the possible allocations of multiple memory objects in multiple memory regions in accordance with the aforesaid quantifiable operation cost to thereby achieve overall operation cost optimization of a computer system and meet the need of the actual operation of the computer system.

In an embodiment of the present invention, a memory control method for a computer system comprises the steps of: calculating an operation cost of each of given M memory objects in each of the N memory regions, M being an integer larger than 0, wherein the operation cost is a quantifiable parameter of a said memory region with respect to a said memory object operating therein; and determining an optimized allocation of the M memory objects in the N memory regions according to the calculated operation cost of each of the M memory objects in each of the N memory regions. In particular, the method further comprises allocating the M memory objects to the N memory regions according to the optimized allocation.

In another embodiment of the present invention, a computer system comprises: at least a processor; N memory regions comprising at least a first memory region and a second memory region, the first memory region pre-storing a first memory object accessible by the processor, wherein N is an integral larger than 1; and a memory controller having functions of: calculating an operation cost of the first memory object in the first memory region, wherein the operation cost is a quantifiable parameter of a memory region with respect to a memory object operating therein; determining whether to move the first memory object to the second memory region according to the calculated operation cost of the first memory object in the first memory region.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

DETAILED DESCRIPTION OF EXEMPLARY EMBODIMENTS

Figure 1:
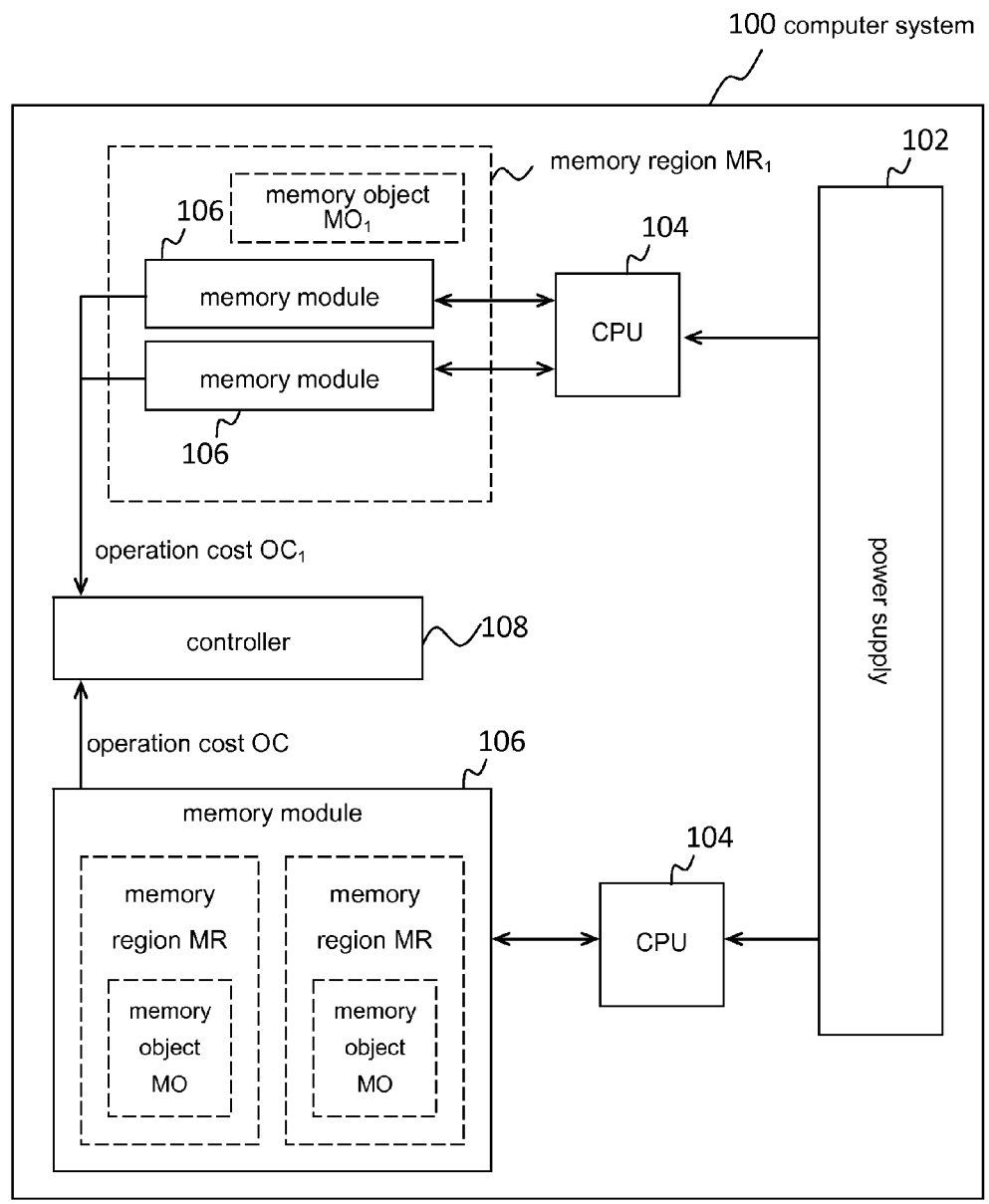
FIG. 1 is a schematic view of a computer system according to a specific embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
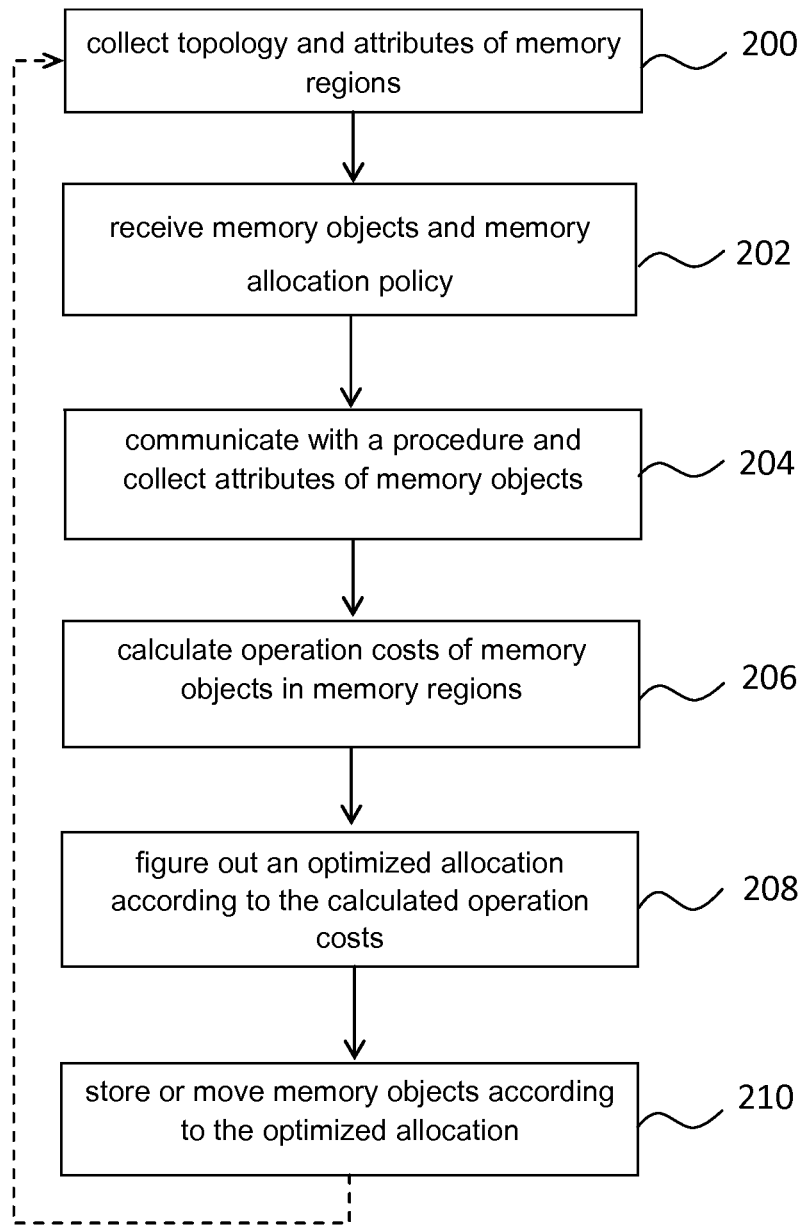
FIG. 2 is a flow chart of a method according to a specific embodiment of the present invention.
Figure 3:
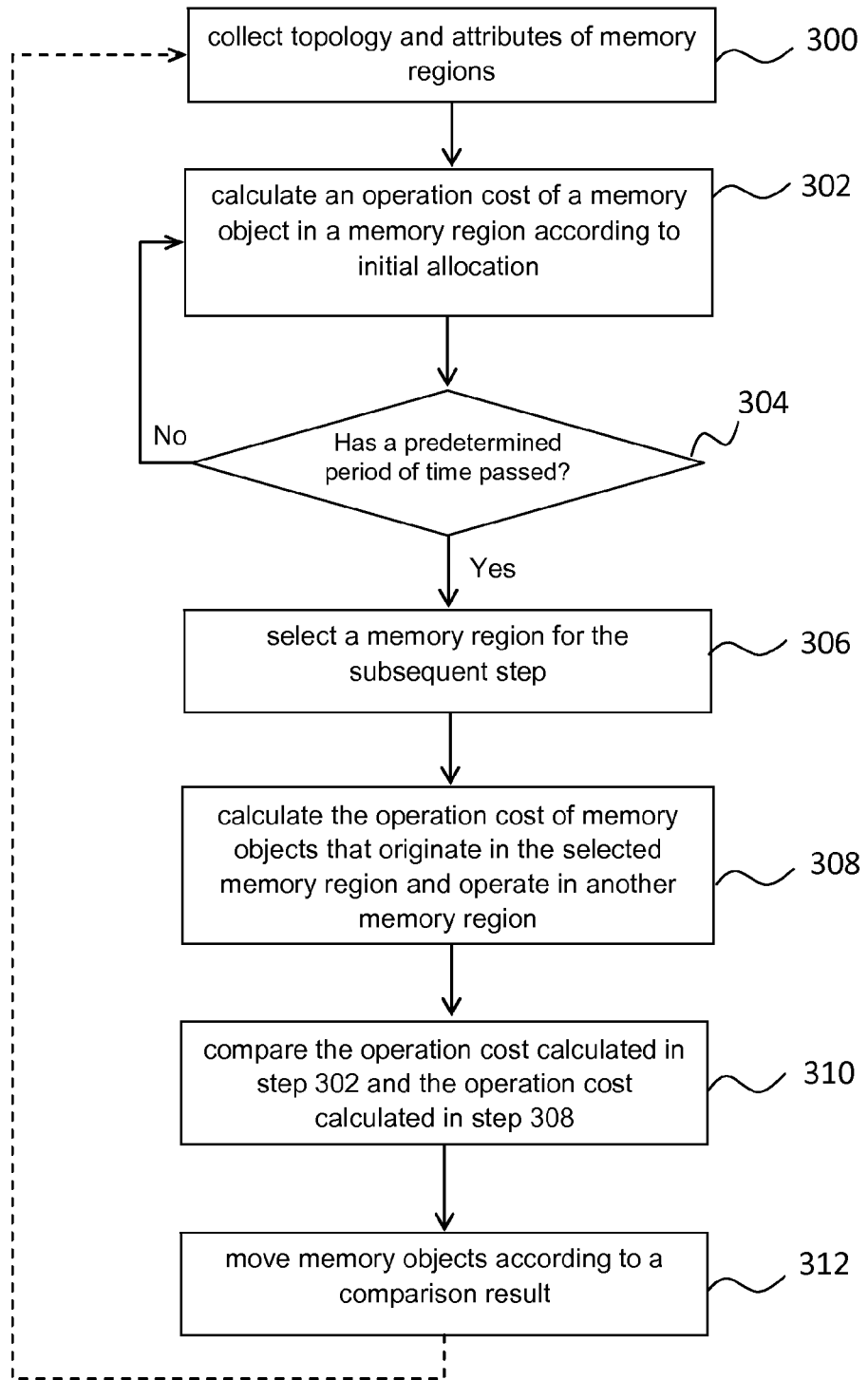
FIG. 3 is a flow chart of a method according to another specific embodiment of the present invention.

Referring now to FIG. 1 through FIG. 3, computer systems, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

System Framework

FIG. 1 shows a hardware framework of a computer system 100 in an embodiment. The computer system 100 comprises a power supply 102, one or more CPU(s) 104, one or more memory module(s) 106, and a controller 108. Other basic frameworks and components of the computer system 100 are identical to conventional ones of a typical personal computer or server, such as IBM's System X, Blade Center or eServer server, or identical to frameworks and components of a blade server system disclosed in US2011/0145609, and thus they are not described in detail for the sake of brevity.

In particular, memory objects MO which are generated by an application or an operating system on the computer system 100 and accessible by the CPUs 104 are stored in the memory modules 106. In an embodiment of the present invention, the memory objects MO are disposed in memory regions MR. The memory regions MR are further planned by an operating system or a Basic Input/Output System (BIOS) of the computer system 100 in accordance with all the available memory space of the computer system 100. Hence, in an embodiment of the present invention, although memory regions MR can be designed to include multiple memory modules 106, the memory modules 106 can also be designed to include multiple memory regions MR. Details of the memory regions MR and the memory objects MO are disclosed in US 2011/0145609. Related details are not described herein for the sake of brevity. In order to illustrate the present invention, the computer system 100 in this embodiment has multiple different memory regions MR which are provided with (or correspond to) different quantifiable resources, such as memory region size, baseband, energy consumption, and performance.

A controller 108 comprises a microprocessor and a memory (not shown) and can come in the form of a standalone controller or can be integrated into a mainboard management controller (not shown) or the CPUs 104 of the computer system 100. However, in another embodiment, functions of the controller 108 are performed by means of an operating system (OS) of the computer system 100, and the present invention is not limited thereto.

A memory control method according to an embodiment of the present invention is illustrated hereunder with the hardware framework shown in FIG. 1 and the flow chart of FIG. 2.

Memory Control: First Embodiment

Step 200: the controller 108 collects topology and attributes of memory regions MR. For instance, the controller 108 knows the baseband, size, and quantity of N memory regions MR available on the computer system 100.

Step 202: the controller 108 receives M memory objects MO. Furthermore, according to the prior art, memory objects MO are predefined with a memory allocation policy, and the controller 108 receives the memory allocation rule in this step.

Step 204: the controller 108 communicates with an application procedure or an operating system for generating memory objects MO and collects data required for processing memory objects MO, so as to know the attributes of the memory objects MO, for example, the processor accesses the nominal access frequency of the memory objects MO. Hence, in this step, the controller 108 figures out an initial allocation of the M memory objects MO in the N memory regions MR according to a conventional memory allocation rule and the attributes of the memory objects MO, for example, by applying the method disclosed in US 2011/0145609. Related details are not described herein for the sake of brevity.

Step 206: calculate an operation cost of each memory object MO in each of the memory regions MR. In this embodiment, the operation cost of the memory object MO in its memory regions MR equals the product of the size of the memory regions MR occupied, i.e., used, by the memory object MO, baseband of the memory regions MR, and access frequency of the CPUs 104 accessing the memory object MO in the memory regions MR. A point to note is that, in this step, a nominal access frequency is applicable to the access frequency of the CPUs 104 accessing the memory object MO in the memory regions MR, and is, for example, figured out by the aforesaid step 204 or by any other measurement-free means.

However, in another embodiment, if, prior to step 206, the M memory objects MO have already been allocated and stored in the N memory regions MR according to an initial allocation determined in step 204 in a conventional way, step 206 can further comprise, subsequently, measuring the access frequency of the CPUs 104 accessing the memory objects MO in the memory regions MR and calculating the operation cost according to the measured access frequency. Like the measured access frequency, the operation cost in this embodiment can also be calculated, using a parameter measured during the operation of the memory objects MO or during the operation of the memory regions MR to thereby reflect a dynamic change in a real situation or even set an operation cost to a time-dependent function. Furthermore, it is also feasible to use a user-determined parameter or a user-defined parameter and thereby, for example, increase or decrease a weight of an operation cost incurred by a specific memory object MO or a specific memory region MR.

Step 208: perform a linear programming solution according to the operation costs incurred by the different M memory objects in the different memory regions and calculated in step 206 so as to figure out and determine an optimized allocation of the M memory objects in the N memory regions. For instance, given the optimized allocation, the sum of the operation costs on the computer system 10 is the minimum or falls within an allowable range. Given the linear programming solution, it is also feasible to use other limitation criteria (for example, a planning result should not go against the memory allocation policy of step 202) and figure out the sum and the minimal value of the operation costs which meet the limitation criteria, so as to be used in the optimized allocation. However, the present invention is not restricted to figuring out an optimized allocation by means of a linear programming solution. Persons skilled in the art should be able to figure out mathematical optimization easily by any other algorithmic means.

Step 210: allocate and store the M memory objects MO in the N memory regions MR according to the optimized allocation determined in step 208. If, prior to step 210, the M memory objects MO have already been stored in the N memory regions MR according to the initial allocation determined in step 204 in a conventional way, step 210 will comprise identifying, according to the initial allocation and the optimized allocation, the memory objects MO to be moved and thereby moving only those memory objects MO which have to be moved. Persons skilled in the art are familiar with a method for moving the memory objects MO to different memory regions MR by, for example, using direct memory access (DMA). Related details are not described herein for the sake of brevity.

A point to note is that step 200 through step 210 can be executed repeatedly or executed according to a predetermined schedule. Hence, in the situation where the number N of memory regions MR is changed to Q (for example, when some of the memory modules 106 are created or removed), or in the situation where the number M of memory objects MO is changed to P (for example, when a new application starts or when an application ends), the optimized allocation can be determined in real time in response to the latest condition.

A memory control method according to an embodiment of the present invention is further illustrated with the hardware framework shown in FIG. 1 and the flow chart of FIG. 3. In particular, before performing the steps shown in FIG. 3, the M memory objects MO have already been stored in the N memory regions MR according to an initial allocation (or any allocation which has already been given before the process flow of FIG. 3 starts.)

Memory Control: Second Embodiment

Step 300: the controller 108 collects topology and attributes of memory regions MR. Step 300 is similar to step 200.

Step 302: calculate the operation cost of each of the memory objects MO in the corresponding one of the memory regions MR according to the initial allocation. Like step 206, step 302 is characterized in that the operation cost of each of the memory objects MO in the corresponding one of the memory regions MR equals the product of the size of the memory regions MR occupied by the memory objects MO, baseband of the memory regions MR, and access frequency of the CPUs 104 accessing the memory objects MO in the memory regions MR. The access frequency of the CPUs 104 accessing the memory objects MO in the memory regions MR is a nominal access frequency; however, unlike step 206, step 302 is characterized in that the access frequency of the CPUs 104 accessing the memory objects MO in the memory regions MR can also be a measured access frequency.

Step 304: determine whether a predetermined period of time has passed. If the determination is negative, go to step 302 again to calculate an operation cost according to the latest data. If the determination is affirmative, go to step 306.

Step 306: select a memory region MR for executing the subsequent step 308 through step 312. That is to say, the subsequent step 308 through step 312 are not necessarily carried out to all the N memory regions MR. In this embodiment, in order to illustrate the present invention, it is presumed that step 306 entails selecting a first memory region $MR_1$, wherein a first memory object $MO_1$ is stored in the first memory region $MR_1$ according to the initial allocation, and the operation cost of the first memory region $MR_1$ is denoted with $OC_1$ when calculated in step 302.

Step 308: calculate the operation cost OC of the first memory object $MO_1$ in the memory regions MR other than the first memory region $MR_1$. Like step 206, in step 308, the operation cost of the memory object MO in its memory region MR equals the product of the size of the memory regions MR occupied by the memory object MO, baseband of the memory regions MR, and access frequency of the CPUs 104 accessing the memory object MO in the memory regions MR. A point to note is that, in this step, the access frequency of the CPUs 104 accessing the memory object MO in the other memory regions MR is a nominal access frequency or is figured out by any other measurement-free means.

Step 310: compare the operation cost $OC_1$ calculated in step 302 regarding the first memory object $MO_1$ in the first memory region $MR_1$ and the operation cost OC calculated in step 308 regarding the first memory object $MO_1$ in any other memory region outside the first memory region $MR_1$. If the operation cost OC in any other memory regions is lower than the operation cost $OC_1$ in the first memory region $MR_1$, the process flow of the method will go to step 312.

Step 312: move the first memory object $MO_1$ from the first memory region $MR_1$ to one of other memory regions MR and preferably to the memory region MR which incurs the lowest operation cost.

In the above embodiment, as regards a specific memory object $MO_1$, step 310 entails comparing the operation cost $OC_1$ of the specific memory object $MO_1$ based on the initial allocation with the operation cost OC based on all other possible allocations. However, in another embodiment, it is feasible for step 310 to compare the operation cost $OC_1$ based on the initial allocation (i.e., storing the first memory region $MR_1$) with a reference value which is predetermined and related to the first memory region $MR_1$ (for example, the highest operation cost incurred in the first memory region $MR_1$ and permitted by the computer system 100.)

Furthermore, in step 306, multiple memory regions MR and corresponding ones of multiple memory objects MO are selected for executing step 308 through step 312. Likewise, in step 310 and step 312, in addition to the operation costs of individual memory objects MO, considerations are preferably given to the common operation costs of the multiple memory objects MO. For example, it is also feasible for step 310 and step 312 to determine whether the sum of the common operation costs of the memory objects MO exceeds the highest operation cost permitted by the computer system 100, and the determination process is performed by means of the linear programming solution of step 208.

A point to note is that, like FIG. 2, step 300 through step 312 of FIG. 3 can also be executed repeatedly or executed according to a predetermined schedule. Hence, in the situation where the number N of memory region MR is changed to Q (for example, when some of the memory modules 106 are created or removed), or in the situation where the number M of memory object MO is changed to P (for example, when a new application starts or when an application ends), the optimized allocation can be determined in real time in response to the latest condition.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A memory control method for a computer system, the computer system having N memory regions, N being an integer larger than 1, the method comprising the steps of:
    (a) calculating an operation cost of each of given M memory objects in each of N memory regions of a computer system, M being an integer larger than 0 and N being an integer larger than 1, wherein the operation cost is a quantifiable parameter of a memory region with respect to a memory object operating therein, the operation cost including at least an energy consumption cost and one or more costs associated with a user-defined parameter;
    (b) determining an optimized allocation of the M memory objects in the N memory regions according to the calculated operation cost of each of the M memory objects in each of the N memory regions;
    (c) calculating the operation cost of each of the M memory objects in each of the Q memory regions in response to changing the N memory regions to Q memory regions, wherein Q is an integer larger than 1; and
    (d) determining an optimized allocation of the M memory objects in the Q memory regions according to the operation cost of each of the M memory objects in each of the Q memory regions;

(e) comparing an operation cost of a specific memory object based on the optimized allocation of the M memory objects in the N memory regions to other operation costs of the specific memory object based on other possible allocations including the optimized allocation of the M memory objects in the Q memory regions; and (f) moving the specific memory object in accordance with the comparison of the operation cost of the specific memory object.

2. The method of claim 1, wherein the operation cost of each of the M memory objects in each of the N memory regions is calculated according to at least one of a size of the memory region occupied by the memory object and an access frequency of a processor accessing the memory object in the memory region, or a combination thereof.

3. The method of claim 2, wherein the access frequency of the processor accessing the memory object in the memory regions is a nominal access frequency or a measured access frequency.

4. The method of claim 1, wherein, after (f), the method further comprises:

(g) calculating the operation cost of each of the P memory objects in each of the N memory regions in response to changing the M memory objects to P memory objects, wherein P is an integer larger than 0; and (h) determining an optimized allocation of the P memory objects in the N memory regions according to the operation cost of each of the P memory objects in each of the N memory regions.

5. The method of claim 4, wherein changing the M memory objects to P memory object is performed in response to starting a new application or ending an application.

6. The method of claim 1, wherein (a) further comprises receiving a user input for the user-defined parameter.

7. The method of claim 1, wherein calculating the operation cost of each of the M memory objects in each of the N memory regions is based at least in part on a product of a size of the memory region occupied by the memory object and an access frequency of a processor accessing the memory object in the memory region.

8. The method of claim 1, wherein changing the N memory regions to Q memory regions is performed in response to creating or removing a subset of the N memory regions.

9. The method of claim 1, wherein the method further comprises:

(c) calculating common operation costs of the M memory objects;

(d) determining a sum of the common operation costs of the M memory objects exceeds a highest operation cost permitted by the computer system.

10. A computer system, comprising:

at least a processor;

N memory regions comprising at least a first memory region and a second memory region, the first memory region pre-storing a first memory object accessible by the processor, wherein N is an integral larger than 1; and a memory controller configured to perform operations comprising:

(a) calculating an operation cost of the first memory object in the first memory region, wherein the operation cost is a quantifiable parameter of a memory region with respect to a memory object operating therein, the operation cost including at least an energy consumption cost and one or more costs associated with a user-defined parameter;

(b) determining whether to move the first memory object to the second memory region according to the calculated operation cost of the first memory object in the first memory region;

(c) calculating the operation cost of each of the M memory objects in each of the Q memory regions in response to increasing or decreasing the N memory regions to Q memory regions, wherein Q is an integer larger than 1; and (d) determining an optimized allocation of the M memory objects in the Q memory regions according to the operation cost of each of the M memory objects in each of the Q memory regions, so as to determine whether to move each of the M memory objects (e) comparing an operation cost of a specific memory object based on the optimized allocation of the M memory objects in the N memory regions to other operation costs of the specific memory object based on other possible allocations including the optimized allocation of the M memory objects in the Q memory regions; and (f) moving the specific memory object in accordance with the comparison of the operation cost of the specific memory object.

11. The computer system of claim 10, wherein operation (a) of the memory controller further comprises calculating the operation cost of the first memory object in the second memory region, wherein operation (b) of the memory controller further comprises determining whether to move the first memory object to the second memory region according to the operation cost of the first memory object in the first memory region and the operation cost of the first memory object in the second memory region.

12. The computer system of claim 11, wherein calculating the operation cost of the first memory object in the second memory region is based at least in part on a product of a size of the second memory region occupied by the first memory object and an access frequency of the processor accessing the first memory object in the second memory region.

13. The computer system of claim 10, wherein the N memory regions pre-store M memory objects, wherein M is an integer larger than 0, wherein operation (a) further comprises calculating the operation cost of each of the M memory objects in each memory region, wherein operation (b) further comprises determining an optimized allocation of the M memory objects in the N memory regions according to the operation cost of each of the M memory objects in each memory region, so as to determine whether to move each of the M memory objects.

14. The computer system of claim 13, wherein the memory controller further performs operations comprising:

(g) calculating the operation cost of each of the P memory objects in each of the N memory regions in response to changing the M memory objects to P memory objects, wherein P is an integer larger than 0; and (h) determining an optimized allocation of the P memory objects in the N memory regions according to the operation cost of each of the P memory objects in each of the N memory regions.

15. The computer system of claim 10, wherein operation (a) of the memory controller further comprises receiving a user input so as for a user-defined parameter to be provided for use in calculating the operation cost.

16. The computer system of claim 10, wherein calculating the operation cost of the first memory object in the first memory region is based at least in part on an access frequency of the processor accessing the first memory object in the first memory region.

17. The computer system of claim 10, wherein the access frequency is a nominal access frequency or a measured access frequency.

18. The computer system of claim 10, wherein calculating the operation cost of the first memory object in the first memory region is based at least in part on a product of a size of the first memory region occupied by the first memory object and an access frequency of the processor accessing the first memory object in the first memory region.

* * * * *